(12) United States Patent
Nedorezov et al.

(10) Patent No.: US 8,892,291 B2
(45) Date of Patent: Nov. 18, 2014

(54) VEHICLE MASS DETECTION SYSTEM

(71) Applicant: Ford Global Technologies, LLC, Dearborn, MI (US)

(72) Inventors: Felix Nedorezov, Rochester Hills, MI (US); Hong Jiang, Birmingham, MI (US); Matthew John Shelton, Grosse Ile, MI (US); Daniel Colvin, Farmington Hills, MI (US); Zhengyu Dai, Canton, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 13/796,266

(22) Filed: Mar. 12, 2013

(65) Prior Publication Data

US 2014/0277867 A1 Sep. 18, 2014

(51) Int. Cl.
*B60W 20/00* (2006.01)
*B60W 10/06* (2006.01)
*B60W 10/08* (2006.01)

(52) U.S. Cl.
CPC ............... *B60W 20/00* (2013.01); *B60W 10/06* (2013.01); *B60W 10/08* (2013.01); *Y10S 903/93* (2013.01)
USPC ........ 701/22; 180/65.1; 180/65.265; 903/930

(58) Field of Classification Search
CPC ... B60W 20/00; B60K 6/48; B60L 2240/421; B60T 1/10
USPC ............ 701/1, 22, 36, 37, 41, 45, 48, 51, 54, 701/65, 69–71, 74, 82, 83, 29.3, 32.4, 124; 702/33, 44, 57, 64, 65, 79, 101, 141, 702/142, 145, 148, 173–175; 340/439
See application file for complete search history.

(56) References Cited

U.S. PATENT DOCUMENTS

| | | | | |
|---|---|---|---|---|
| 5,070,959 A | * | 12/1991 | Grabowski | 180/167 |
| 5,215,154 A | * | 6/1993 | Kirby | 177/136 |
| 5,482,359 A | * | 1/1996 | Breen | 303/9.69 |
| 5,693,876 A | | 12/1997 | Ghitea, Jr. et al. | |
| 6,044,315 A | | 3/2000 | Honeck et al. | |
| 6,092,021 A | * | 7/2000 | Ehlbeck et al. | 701/123 |

(Continued)

OTHER PUBLICATIONS

Nice, Karim, and Julia Layton. "How Hybrid Cars Work" Jul. 20, 2000. HowStuffWorks.com. <http://auto.howstuffworks.com/hybrid-car.htm> May 12, 2014.*

(Continued)

Primary Examiner — Thomas Tarcza
Assistant Examiner — Tyler J Lee
(74) Attorney, Agent, or Firm — David B. Kelley; Brooks Kushman P.C.

(57) ABSTRACT

A vehicle system and a method for calculating a vehicle mass is provided. In at least one embodiment, the system and the method measure current consumed by an electric machine of the vehicle to calculate vehicle mass. A controller of the vehicle uses the calculated mass to control operation of the vehicle, for example a four wheel drive, transmission, stability control, or brake system of the vehicle. A GPS and tire speed sensor system may be incorporated to detect the presence of a towed object, for example a trailer, and to further adjust operation of the vehicle.

16 Claims, 3 Drawing Sheets

(56) References Cited

U.S. PATENT DOCUMENTS

| | | | |
|---|---|---|---|
| 6,167,357 A * | 12/2000 | Zhu et al. | 702/175 |
| 6,230,496 B1 * | 5/2001 | Hofmann et al. | 60/706 |
| 6,347,269 B1 * | 2/2002 | Hayakawa et al. | 701/51 |
| 6,567,734 B2 * | 5/2003 | Bellinger et al. | 701/51 |
| 6,633,006 B1 * | 10/2003 | Wolf et al. | 177/25.13 |
| 6,686,878 B1 | 2/2004 | Lange | |
| 6,718,263 B1 | 4/2004 | Glass et al. | |
| 7,032,468 B2 * | 4/2006 | Yamada et al. | 73/865 |
| 7,174,171 B2 | 2/2007 | Jones | |
| 7,174,243 B1 | 2/2007 | Lightner et al. | |
| 7,197,422 B2 * | 3/2007 | Gaunt et al. | 702/138 |
| 7,228,211 B1 | 6/2007 | Lowrey et al. | |
| 7,317,982 B2 * | 1/2008 | Tsukasaki et al. | 701/70 |
| 7,360,615 B2 * | 4/2008 | Salman et al. | 180/65.265 |
| 7,499,826 B2 * | 3/2009 | Huh et al. | 702/142 |
| 7,650,219 B2 | 1/2010 | Livshiz et al. | |
| 7,698,049 B2 | 4/2010 | Whitney et al. | |
| 7,979,185 B2 * | 7/2011 | Wolfgang et al. | 701/64 |
| 8,009,026 B2 | 8/2011 | Giuli | |
| 8,054,193 B1 | 11/2011 | Breed et al. | |
| 8,096,174 B2 * | 1/2012 | Katou | 73/146.3 |
| 8,554,511 B2 * | 10/2013 | Fujita et al. | 702/175 |
| 8,612,076 B2 | 12/2013 | Maini et al. | 701/22 |
| 8,676,459 B2 * | 3/2014 | Stursa et al. | 701/58 |
| 2004/0034460 A1 | 2/2004 | Folkerts et al. | |
| 2005/0026697 A1 | 2/2005 | Balahura et al. | |
| 2005/0187714 A1 | 8/2005 | Brulle-Drews | |
| 2006/0064232 A1 | 3/2006 | Ampunan et al. | |
| 2006/0226967 A1 | 10/2006 | Tranchina | |
| 2007/0027602 A1 * | 2/2007 | Unno et al. | 701/51 |
| 2007/0162550 A1 | 7/2007 | Rosenberg | |
| 2008/0039990 A1 * | 2/2008 | Stevens et al. | 701/22 |
| 2008/0082221 A1 | 4/2008 | Nagy | |
| 2008/0146343 A1 | 6/2008 | Sullivan et al. | |
| 2008/0177554 A1 * | 7/2008 | Srinivasan et al. | 705/1 |
| 2008/0220878 A1 | 9/2008 | Michaelis | |
| 2008/0274810 A1 | 11/2008 | Hayashi et al. | |
| 2009/0011834 A1 | 1/2009 | Chhabra | |
| 2009/0047982 A1 | 2/2009 | Shi et al. | |
| 2009/0081947 A1 | 3/2009 | Margis | |
| 2009/0093236 A1 | 4/2009 | Balan et al. | |
| 2009/0306890 A1 | 12/2009 | Yoshida | |
| 2010/0030415 A1 * | 2/2010 | Tang | 701/22 |
| 2010/0075593 A1 | 3/2010 | Lee et al. | |
| 2010/0077094 A1 | 3/2010 | Howarter et al. | |
| 2010/0163220 A1 | 7/2010 | Nakajima | |
| 2010/0197406 A1 | 8/2010 | Giuli | |
| 2010/0207755 A1 | 8/2010 | Watson et al. | |
| 2010/0214089 A1 | 8/2010 | Guili | |
| 2010/0250042 A1 * | 9/2010 | Shamoto | 701/22 |
| 2010/0280678 A1 | 11/2010 | Tate, Jr. et al. | |
| 2011/0045842 A1 | 2/2011 | Rork et al. | |
| 2011/0107239 A1 | 5/2011 | Adoni et al. | |
| 2011/0137996 A1 | 6/2011 | Stewart | |
| 2011/0178666 A1 * | 7/2011 | Marcus | 701/22 |
| 2011/0238752 A1 | 9/2011 | Weiss et al. | |
| 2011/0251747 A1 * | 10/2011 | Imai et al. | 701/22 |
| 2012/0001744 A1 | 1/2012 | Giuli | |
| 2012/0296538 A1 * | 11/2012 | Kresse | 701/54 |
| 2013/0073113 A1 * | 3/2013 | Wang et al. | 701/1 |

OTHER PUBLICATIONS

Printout from http://www.core77.com/greenergadgets/entry, Tweet-a-Watt, A twittering power meter, Limor Fried, Adafruit Industries & Phillip Torrone MAKE magazine (United States).

Printout from http://hackaday.com/2009/01/02/twittering-washing-machine/, Twitter washing machine.

Printout from http://www.intomobile.com/2008/07/19/twinkle-hits-appstore-location-based-twitter-client, Client for iPhone.

Printout from http://www.tuae.com/2008/04/22/twinkle-geolocational-twitter-on-iphone, Twinkle: location-aware Twitter client for iPhone.

Printout from http://www.iphonehacks.com/2008/04/twitter-twinkle.html, Twinkle-iPhone Twitter App adds Location Feature.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

VEHICLE MASS DETECTION SYSTEM

TECHNICAL FIELD

This disclosure relates to techniques for detecting the mass of a vehicle.

BACKGROUND

The term "electric vehicle" as used herein, includes vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. A HEV includes an internal combustion engine and an electric motor, wherein the energy source for the engine is fuel and the energy source for the motor is a battery. In a HEV, the engine is the main source of energy for vehicle propulsion with the battery providing supplemental energy for vehicle propulsion (the battery buffers fuel energy and recovers kinematic energy in electric form). A PHEV is like a HEV, but the PHEV has a larger capacity battery that is rechargeable from the external electric grid. In a PHEV, the battery is the main source of energy for vehicle propulsion until the battery depletes to a low energy level, at which time the PHEV operates like a HEV for vehicle propulsion.

SUMMARY

In at least one embodiment, a method of controlling a vehicle including an electric machine based on vehicle mass is provided. The method may comprise, while a speed of the electric machine is changing, measuring current consumed by the electric machine at two different instances of time, calculating a mass of the vehicle based on the measured currents, and controlling operation of the vehicle according to the calculated mass. Examples of vehicle systems controlled according to the calculated mass include a four wheel drive control system, transmission control system, stability control system, and/or a brakes system. While the speed of the electric machine is changing, an constant engine propulsive torque may be maintained. In another example, the engine may provide no propulsive torque while the speed of the electric machine is changing.

The method may further comprise tracking a distance traveled by the vehicle and a number of tire revolutions of the vehicle for the distance traveled and comparing the distance traveled and the number of tire revolutions to stored data corresponding to a number of tire revolutions for the distance traveled at a given mass of the vehicle. The controlling operation of the vehicle according to the calculated mass may include adjusting operation of the vehicle according to the comparison. In another example, the stored data may further comprise data corresponding to a number of tire revolutions for the distance traveled at a plurality of vehicle masses.

The method may also comprise detecting a presence of a towed object attached to the vehicle based on at least one of the measured currents and the comparison. If no towed object is detected, a correction factor may be created for the adjustment of the operation of the vehicle based on the measured currents.

In at least one embodiment, a vehicle is provided. The vehicle may comprise an electric machine, a driveline, a traction battery, and at least one controller programmed to command the electric machine to apply a braking torque to the driveline of the vehicle based on a mass of the vehicle such that when the electric machine is outputting a propulsive torque to the driveline, a magnitude of current from the electric machine to the traction battery varies according to the mass of the vehicle and when the electric machine is not outputting a propulsive torque to the driveline, the magnitude of the current remains generally constant.

In at least one embodiment, a vehicle system is provided. The system may comprise an electric machine and at least one controller programmed to control operation of the vehicle based on current consumed by the electric machine at different instances of time while the vehicle is accelerating. Examples of vehicle systems controlled based on the current consumed include a four wheel drive control system, transmission control system, stability control system, and/or a brakes system. The system may further comprise a vehicle engine. In one example, the engine is configured to output a constant propulsive torque during and between the different instances of time while the vehicle is accelerating. In another example the engine is configured to output no propulsive torque during and between the different instances of time while the vehicle is accelerating.

The system may further include a global positioning system (GPS) in communication with the at least one controller. The GPS device may be configured to track a distance traveled by the vehicle. At least one tire speed sensor may be included and be configured to measure a number of tire revolutions of the vehicle for the distance traveled. Data may be stored corresponding to a number of tire revolutions for the distance traveled at a given mass of the vehicle, and the at least one controller may compare the distance traveled and the number of tire revolutions to the stored data and adjusts operation of the vehicle based on current consumed according to the comparison. The stored data may further comprise data corresponding to a number of tire revolutions for the distance traveled at a plurality of vehicle masses.

In one example, the at least one controller is programmed to control operation of the vehicle based on current consumed by the electric machine at two different instances of time while the vehicle is accelerating. In another example, the at least one controller is programmed to control operation of the vehicle based on current consumed by the electric machine at four different instances of time while the vehicle is accelerating.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Knowing the mass or weight of a vehicle can be beneficial to a variety of vehicle control systems, such as a four wheel drive control system, transmission, stability controls, brakes, and others. Detecting mass in vehicles having internal combustion engines can be inaccurate because it relies on measurement of acceleration and an estimate of traction force using output torque estimates. However, output torque estimates are known to be inaccurate because they depend on many parameters that cannot be directly measured. For a hybrid vehicle, it is also important to know vehicle mass to improve the management of regenerative braking and drivability. Management of regenerative braking and drivability are especially relevant when the vehicle is towing an extra load, such as a trailer. Knowing the total mass of the vehicle plus load (e.g. trailer weight) is therefore beneficial.

Figure 1:
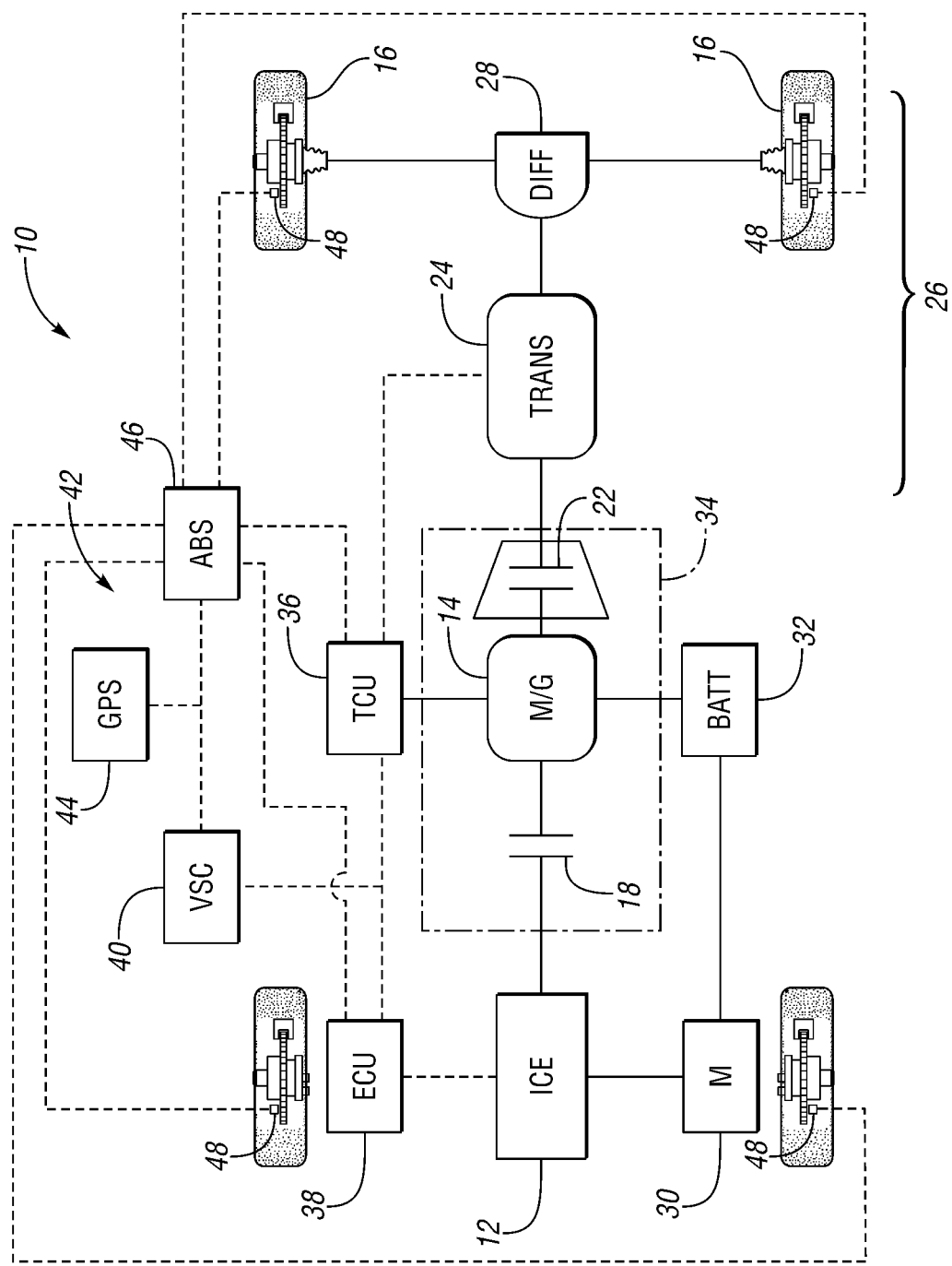
FIG. 1 is a schematic diagram of a vehicle.

FIG. 1 illustrates a schematic diagram of a hybrid vehicle 10. However, vehicle 10 is only an example of a suitable vehicle and the mass detection system may be implemented in vehicles having other configurations. The vehicle 10 includes an engine 12 and an electric machine, which in the embodiment shown in FIG. 1 is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or upstream clutch. The clutch 18 may also include a damper mechanism such as a series of plates and springs configured to help dampen changes in torque transferred between the engine 12 and the M/G 14 when the disconnect clutch 18 is being engaged. A second clutch 22, also known as a launch clutch or downstream clutch, connects the M/G 14 to a transmission 24, and all of the input torque to the transmission 24 flows through the launch clutch 22. The launch clutch 22 may be controlled to isolate the M/G 14 and the engine 12 from components downstream of the launch clutch 22 including the transmission 24, differential 28 and the vehicle drive wheels 16. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 including a traditional clutch and a torque converter having a bypass (lock-out) clutch.

The engine 12 output shaft is connected to the disconnect clutch 18, which in turn is connected to the input shaft of the M/G 14. The M/G 14 output shaft is connected to the launch clutch 22, which in turn is connected to the transmission 24. The launch clutch 22 connects the vehicle prime movers to the driveline 26, which includes the transmission 24, differential 28, and vehicle wheels 16. The components of the vehicle 10 are positioned sequentially in series with one another. In other embodiments, the algorithms described herein may be applied to hybrid vehicle having other system architectures.

In other examples, the downstream clutch 22 is a torque converter with a bypass clutch. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the downstream clutch device 22 using the torque converter. The torque converter may also include a lockup clutch.

The engine 12 is a direct injection engine. Alternatively, the engine 12 may be another type of engine or prime mover, such as a port injection engine or fuel cell, or use various fuel sources, such as diesel, biofuel, natural gas, hydrogen, or the like.

In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events. This isolates the M/G 14 during engine start and may eliminate or reduce torque disturbances that would otherwise occur when torque is transferred from the M/G 14 to the engine 12.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. In one example the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter.

The transmission 24 is controlled using a transmission control unit (TCU) 36 or the like to execute a shift schedule, such as a production shift schedule, that connects and disconnects elements within the gear box to control the ratio between the transmission output and transmission input. In one example, the TCU 36 also acts to control the M/G 14, the clutches 18, 22, and any other components within the motor generator case 34. However, other controllers could also be used to control these components.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that minimizes or eliminates torque disturbances and impact on the driver.

Unlike in an internal combustion engine, torque estimation in an electric machine can be done accurately because in an electric machine, current is proportional to the torque developed. Therefore, by isolating the torque of the M/G 14, an accurate measurement of the mass of vehicle 10 can be determined. Isolating the torque of the M/G 14 can be done in various ways. In one embodiment, the VSC 40 or a combination of controllers in the control system 42 may be configured to maintain the torque of the engine 12 at a constant level that is below a driver demand level for a period of time, while the balance of the demanded torque is provided by the M/G 14. The measurement could be taken, for example, while the vehicle is accelerating from a stop (launching). In one embodiment, the measurement is taken during a first launch. With the engine 12 torque held constant, the change in acceleration can be measured as a function of the change in the M/G 14 torque, which is proportional to the current. The time period over which the measurement is taken (e.g., time the engine 12 torque is held constant) can be calibrated as a function of the driver demand torque so as to avoid affecting performance.

In an alternate embodiment, the M/G 14 torque measurement can be taken when the vehicle 10 is operating in an electric-only mode with the engine 12 disconnected via the clutch 18. For example, the measurement could be done while the vehicle 10 is launching. In one embodiment, the measurement is taken during a first launch. In another embodiment, the M/G 14 torque measurement can be taken when the vehicle 10 is decelerating and regenerative braking is active.

In at least one embodiment, the vehicle mass may be calculated using measurements at a time one and time two according to the equations shown below. In at least one embodiment, the vehicle mass may be calculated using measurements at two sets of two closely spaced time points according to the equations shown below. In the equations below, the variables are defined as follows: $F_t$ is traction effort of the vehicle; m is mass of the vehicle; A is acceleration of the vehicle; $R_a$ is aerodynamic resistance; $R_{rl}$ is rolling resistance; $R_g$ is grade resistance; $R_t$ is tire loss; Eng_Tq is engine torque; EM_Tq is Electric Machine torque; Tc_Mult is torque multiplication of the torque converter; K(V) is a coefficient, which is a function of speed (e.g. final drive ratio multiplied by final drive efficiency, divided by tire radius); Gr_Rat is gear ratio including final axle.

$$F_t = mA + R_a + R_{rl} + R_g +$$
$$R_t \ (R_a + R_{rl} + R_g + R_t \text{ can be referred to as ``road load''})$$
Eq. 1

$$R_a = K_1 * V^2 \ (V \text{ is vehicle speed, } K_1 - \text{constant})$$ Eq. 2

$$R_{rl} = K_2 * V$$ Eq. 3

$$R_g = m * g * \sin\alpha$$ Eq. 4

$$R_t = K_3$$ Eq. 5

$$F_t = (\text{Eng\_Tq} + \text{EM\_Tq}) * \text{Tc\_Mult} * K(V) * \text{Gr\_Rat}$$ Eq. 6

$$(\text{EM\_Tq}_1 - \text{EM\_Tq}_2) * \text{Tc\_Mult} * K(V) * \text{Gr\_Rat} =$$
$$m(A_1 - A_2) + ((R_a + R_{rl} + R_g)_1 - (R_a + R_{rl} + R_g)_2)$$
Eq. 7

$$m = \frac{(\text{EM\_Tq}_1 - \text{EM\_Tq}_2) * \text{Tc\_Mult} * K(V) * \text{Gr\_Rat} + ((R_a + R_{rl} + R_g)_2 - (R_a + R_{rl} + R_g)_1)}{(A_1 - A_2)}$$
Eq. 8

The measurement of electric machine torque can be done by the VSC 40 or a separate controller via a sensor connected to the M/G 14 and/or battery 32. In one embodiment, the sensor may be a Hall Effect sensor. In another embodiment, the M/G 14 may have a driver circuit, such as an insulated-gate bipolar transistor (IGBT), with an integrated current measurement sensor. The mass calculation may be done by the VSC 40 or a separate controller. Since the measurements and calculations use vehicle acceleration and electric machine torque, the mass detected can be either for a vehicle alone or a vehicle towing an object, for example a trailer. Calculating a total trailer weight is beneficial for use in the vehicle control systems described above. It, however, is especially beneficial for hybrid vehicles when managing regenerative braking and drivability.

In one example, measurements at two time points were used to estimate vehicle (and any attached trailer) mass using the equations 1-6 above. In this example, the vehicle tested was a truck having a total gross weight of 6,500 pounds and two passengers. The torque converter was locked (Tc_Mult=1), electric machine torque was measured at the driveshaft (EM_Tq=1), and there was no road grade ($R_g$=0). The values of the other variables are listed in Table 1, below. Current speed and electric machine torque were measured at each of the two time points and used to determine a mean speed and mean torque. After performing the unit conversions and calculations, an estimated mass of the vehicle was found to be about 7,013 pounds.

TABLE 1

| | | | |
|---|---|---|---|
| Time 1 (t1) | 36.042 | $K_1$ | 0.026 |
| Time 2 (t2) | 38.028 | $K_2$ | 1.0 |
| Speed at t1 | 22.055 mph | $K_3$ | 30.0 |
| Speed at t2 | 23.306 mph | Tire Radius | 0.382 m |
| Mean Speed | 22.678 mph | Final Drive Ratio | 3.73 |
| EM_Tq at t1 | 97.344 ft-lb | Final Drive Efficiency | 0.95 |
| TM_Tq at t2 | 93.923 ft-lb | Eng_Tq | 0 |
| Mean EM_Tq | 94.613 ft-lb | | |

In another example, two sets of two closely spaced time points were used to estimate vehicle (and any attached trailer) mass using the equations 1-8 above. In this example, the vehicle tested was a truck having a total gross weight of 6,500 pounds and two passengers. The torque converter was locked (Tc_Mult=1), electric machine torque was measured at the driveshaft (EM_Tq=1), and there was no road grade ($R_g$=0). The values of the other variables are listed in Table 2 below. Speed and electric machine torque were measured in quick succession at two points, yielding two sets of speed, electric machine torque, and acceleration data. After performing the unit conversions and using equations 7-8 to solve for mass, an estimated vehicle mass of 6,991 pounds was calculated. Using two sets of closely spaced time points may be beneficial to minimize the effect of road grade, tire resistance, and other variables.

TABLE 2

| | | | |
|---|---|---|---|
| Time 1 (t1) at Point 1 | 35.43 | $K_1$ | 0.026 |
| Time 2 (t2) at Point 1 | 35.88 | $K_2$ | 1.0 |
| Time 1 (t1) at Point 2 | 44.59 | $K_3$ | 30.0 |
| Time 2 (t2) at Point 2 | 45.05 | Tire Radius | 0.382 m |
| Mean Speed at P1 | 21.79 mph | Final Drive Ratio | 3.73 |
| Mean Speed at P2 | 27.16 mph | Final Drive Efficiency | 0.95 |
| Acceleration at P1 | 0.313 m/s/s | Eng_Tq | 0 |
| Acceleration at P2 | 0.251 m/s/s | | |
| Mean EM_Tq at P1 | 96.93 ft-lb | | |
| Mean TM_Tq at P2 | 85.51 ft-lb | | |

It may also be beneficial to calculate a vehicle mass separate from an attached trailer, which assists in coordinating the base brake system, including trailer brakes. In at least one embodiment, an additional system can be used to calculate vehicle-only mass utilizing a vehicle global positioning system (GPS) device 44 and effective tire radius measurement. The GPS device 44 may be integrated into the vehicle 10 or may be an after-market GPS device with a vehicle interface, such as CAN.

Figure 2:
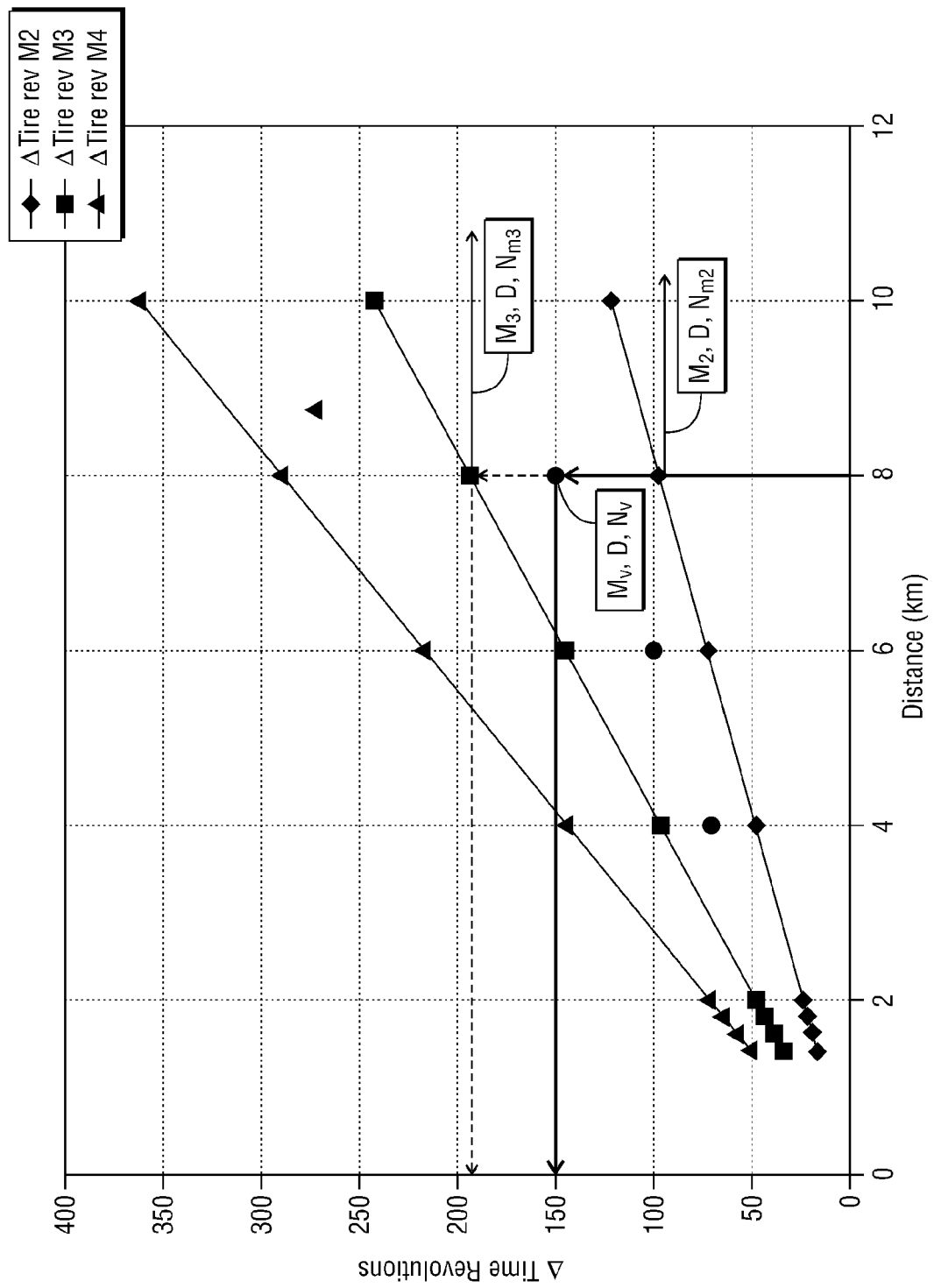
FIG. 2 is a graph of change in tire rotations versus distance for various vehicle masses.

In one embodiment, a pre-programmed table is stored in the VSC 40 or another controller or the GPS device 44 and contains information regarding the number of tire revolutions per distance traveled (e.g. revolutions per mile) with a known vehicle mass (e.g. the known minimum load mass for the vehicle 10). Alternatively, or in addition to the table corresponding to the known load, the pre-programmed table can contain data regarding the delta, or difference, between the number of tire revolutions per distance traveled for different loads compared to the known vehicle load. An example of such a table is shown below as Table 3, which is merely exemplary, and is illustrated in FIG. 2. To account for air temperature, tire pressure, and vehicle speed, correction factors for those and other potential variables can be stored in the VSC 40.

TABLE 3

| Distance (km) | Tire rev M1 | Tire rev M2 | Tire rev M3 | Tire rev M4 | Δ Tire rev M2 | Δ Tire rev M3 | Δ Tire rev M4 |
|---|---|---|---|---|---|---|---|
| 0.2 | 120.17 | 122.57 | 124.97 | 127.38 | 2.40 | 4.81 | 7.21 |
| 0.4 | 240.34 | 245.14 | 249.95 | 254.76 | 4.81 | 9.61 | 14.42 |
| 0.6 | 360.50 | 367.71 | 374.92 | 382.13 | 7.21 | 14.42 | 21.63 |
| 0.8 | 480.67 | 490.29 | 499.90 | 509.51 | 9.61 | 19.23 | 28.84 |
| 1 | 600.84 | 612.86 | 624.87 | 636.89 | 12.02 | 24.03 | 36.05 |
| 1.2 | 721.01 | 735.43 | 749.85 | 764.27 | 14.42 | 28.84 | 43.26 |
| 1.4 | 841.18 | 858.00 | 874.82 | 891.65 | 16.82 | 33.65 | 50.47 |
| 1.6 | 961.34 | 980.57 | 999.80 | 1019.02 | 19.23 | 38.45 | 57.68 |
| 1.8 | 1081.51 | 1103.14 | 1124.77 | 1146.40 | 21.63 | 43.26 | 64.89 |
| 2 | 1201.68 | 1225.71 | 1249.75 | 1273.78 | 24.03 | 48.07 | 72.10 |
| 4 | 2403.36 | 2451.43 | 2499.49 | 2547.56 | 48.07 | 96.13 | 144.20 |
| 6 | 3605.04 | 3677.14 | 3749.24 | 3821.34 | 72.10 | 144.20 | 216.30 |
| 8 | 4806.72 | 4902.85 | 4998.99 | 5095.12 | 96.13 | 192.27 | 288.40 |
| 10 | 6008.40 | 6128.57 | 6248.74 | 6368.90 | 120.17 | 240.34 | 360.50 |

With reference to FIG. 1, when the vehicle 10 is driven, an anti-lock braking system (ABS) controller 46 may count the number of tire revolutions based on the measurements from the ABS tire speed sensors 48. The tire revolutions may be measured from any of the tires; however in at least one embodiment the measurement is taken from the non-driven wheels of the vehicle 10 (e.g. the rear wheels of a front wheel drive vehicle). The GPS 44 in the vehicle 10 measures the distance traveled during the same period as the ABS tire revolution measurement. Utilizing the number of tire revolutions and the distance traveled, an effective tire radius correction factor can be derived as explained below. Correction factors may also be applied for variables such as tire wear and inflation pressure.

Using the exemplary values contained in table 3 and shown in FIG. 2, if the vehicle 10 traveled 8 km and the ABS 46 determined that there was a delta of 150 tire revolutions compared to the known mass (M1), then the mass of the vehicle could be determined according to $$m_v = (m_2 + (m_3 - m_2)*(N_v - N_2)/(N_3 - N_2))*K_c \quad \text{Eq. 9:}$$

which, when inputting the values from table 1, simplifies to $$m_v = m_2 + (m_3 - m_2)*(0.553)*K_c \quad \text{Eq. 10:}$$

where $K_c$ is a correction factor for ambient temperature, tire pressure, tire wear, and other factors. For this method to be accurate, there must be a sufficient number of entries in the table so that the points on the chart are sufficiently close to each other to allow linear interpolation to apply.

The system and method utilizing GPS and tire revolutions may be used alone or in conjunction with the system described above using electric machine torque measurements. In one embodiment, if the electric machine torque-based method determines that there is no trailer attached, for example by determining that the mass of the vehicle is less than a minimum mass of the vehicle plus trailer, then the information obtained can be used to calculate a correction factor for the effective tire radius. The correction factor may be stored in non-volatile memory of the VSC 40 and used to improve the accuracy of the tire revolution and GPS system.

Figure 3:
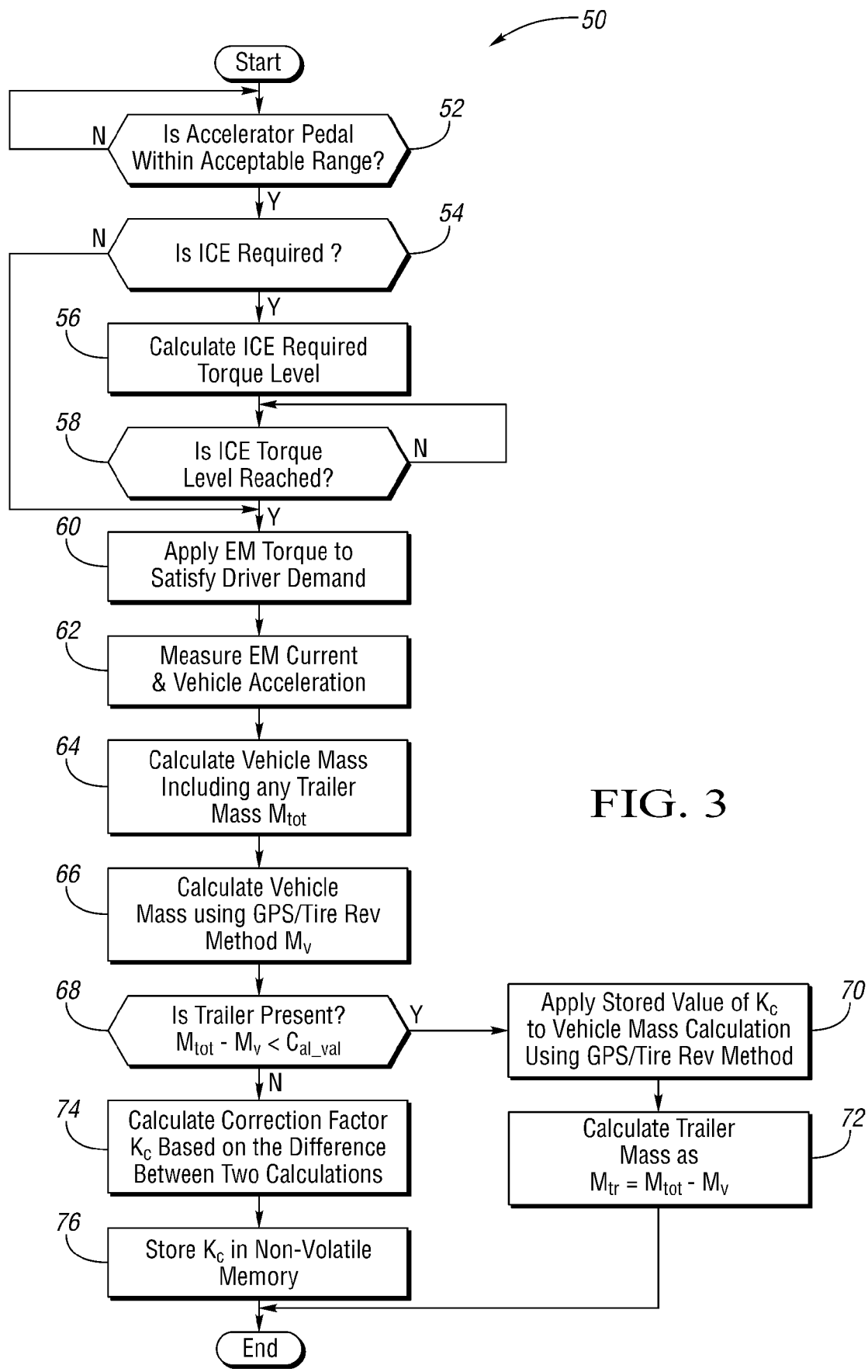
FIG. 3 is a flowchart of an algorithm for calculating vehicle mass.

An embodiment of the method of calculating a vehicle and/or vehicle plus trailer mass is illustrated in the flowchart 50 of FIG. 3. In step 52, the VSC 40 (or another controller) determines if the accelerator pedal is within an acceptable range. If so, it determines if the internal combustion engine (ICE) 12 is required to satisfy driver torque demand in step 54. If the ICE is required, then in step 56 the VSC 40 calculates the torque required from the ICE 12. In step 58, the VSC 40 determines if the ICE 12 torque level is reached. Once the ICE 12 torque level is reached, or if the ICE 12 is not required, the VSC 40 causes the M/G 14 to apply the necessary torque to satisfy the driver demand in step 60. Then in step 62, the VSC 40 measures the M/G 14 current and vehicle 10 acceleration.

In step 64, the total mass of the vehicle plus any attached trailer is calculated according to the equations described previously. In step 66, the vehicle mass is separately calculated using the GPS and tire revolutions method described previously. In step 68, the VSC 40 determines if a trailer is present. This may be done in any suitable way, one example is if the mass calculation based on the electric machine torque determines that the total mass is within a certain amount of the known minimum mass of the vehicle, then no trailer is present. Similarly, if the calculation determines that the total mass is above a certain threshold for passengers and in-vehicle cargo, then a trailer is present. Alternatively, if the mass calculations based on EM torque and the GPS/tire revolutions are significantly different, then a trailer may be present. If a trailer is present, the correction factor $K_c$ is applied to the vehicle mass calculation from the GPS and tire revolution method in step 70 and the trailer mass is calculated by subtracting the vehicle mass from the total mass in step 72. If no trailer is present, then the VSC 40 calculates a correction factor $K_c$ based on the difference between the calculations from the M/G 14 torque method and the GPS and tire revolutions method in step 74 and stores the correction factor in non-volatile memory in step 76.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While certain embodiments have been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A method of controlling an electric vehicle based on vehicle mass, the method comprising:
   providing at least a portion of vehicle propulsive torque with an electric machine;
   while a speed of the electric machine is changing, measuring current consumed by the electric machine at two different instances of time;
   calculating a mass of the vehicle based on the measured currents; and
   controlling operation of the vehicle according to the calculated mass.

2. The method of claim 1, wherein the step of controlling comprises controlling at least one of a four wheel drive control system, transmission control system, stability control system, and a brakes system according to the calculated mass.

3. The method of claim 1 further comprising maintaining a constant engine propulsive torque while the speed of the electric machine is changing.

4. The method of claim 1 further comprising disconnecting an engine of the vehicle such that the engine provides no propulsive torque while the speed of the electric machine is changing.

5. The method of claim 1 further comprising tracking a distance traveled by the vehicle and a number of tire revolutions of the vehicle for the distance traveled and comparing the distance traveled and the number of tire revolutions to stored data corresponding to a number of tire revolutions for the distance traveled at a given mass of the vehicle, wherein controlling operation of the vehicle according to the calculated mass includes adjusting operation of the vehicle according to the comparison.

6. The method of 5, wherein the stored data further comprises data corresponding to a number of tire revolutions for the distance traveled at a plurality of vehicle masses.

7. The method of claim 5 further comprising detecting a presence of a towed object attached to the vehicle based on at least one of the measured currents and the comparison.

8. The method of claim 7, wherein if no towed object is detected, a correction factor is created for the adjustment of the operation of the vehicle based on the measured currents.

9. A vehicle system comprising:
   an electric machine configured to provide a propulsive torque to the vehicle; and
   at least one controller programmed to control operation of the vehicle based on current consumed by the electric machine at different instances of time while the vehicle is accelerating at least in part from the propulsive torque provided by the electric machine.

10. The system of claim 9, wherein the at least one controller is programmed to control at least one of a four wheel drive control system, transmission control system, stability control system, and a brakes system based on current consumed by the electric machine at different instances of time while the vehicle is accelerating.

11. The system of claim 9 further comprising an engine configured to output a constant propulsive torque during and between the different instances of time while the vehicle is accelerating.

12. The system of claim 9 further comprising an engine configured to output no propulsive torque during and between the different instances of time while the vehicle is accelerating.

13. The system of claim 9 further comprising a global positioning system (GPS) in communication with the at least one controller and configured to track a distance traveled by the vehicle and at least one tire speed sensor configured to measure a number of tire revolutions of the vehicle for the distance traveled, wherein the at least one controller is further programmed to compare the distance traveled and the number of tire revolutions to stored data corresponding to a number of tire revolutions for the distance traveled at a given mass of the vehicle and to adjust operation of the vehicle based on the current consumed according to the comparison.

14. The system of claim 13, wherein the stored data further comprises data corresponding to a number of tire revolutions for the distance traveled at a plurality of vehicle masses.

15. The system of claim 9, wherein the at least one controller is further programmed to control operation of the vehicle based on current consumed by the electric machine at two different instances of time while the vehicle is accelerating.

16. The system of claim 9, wherein the at least one controller is further programmed to control operation of the vehicle based on current consumed by the electric machine at four different instances of time while the vehicle is accelerating.

* * * * *